US010323367B2

(12) United States Patent
Martelle

(10) Patent No.: US 10,323,367 B2
(45) Date of Patent: Jun. 18, 2019

(54) PAVER STONE, BRICK AND BLOCK EXTRACTION TOOL

(71) Applicant: David Jay Martelle, Port St. Lucie, FL (US)

(72) Inventor: David Jay Martelle, Port St. Lucie, FL (US)

(*) Notice: Subject to any disclaimer, the term of this patent is extended or adjusted under 35 U.S.C. 154(b) by 0 days.

(21) Appl. No.: 15/988,207

(22) Filed: May 24, 2018

(65) Prior Publication Data
US 2018/0340304 A1    Nov. 29, 2018

Related U.S. Application Data

(60) Provisional application No. 62/511,001, filed on May 25, 2017.

(51) Int. Cl.
B65G 7/12        (2006.01)
E01C 23/12       (2006.01)
E04G 21/16       (2006.01)
E01C 19/52       (2006.01)

(52) U.S. Cl.
CPC ........... E01C 23/121 (2013.01); B65G 7/12 (2013.01); E01C 19/52 (2013.01); E04G 21/162 (2013.01)

(58) Field of Classification Search
CPC ......... B65G 7/12; E04G 21/16; E04G 21/162; E01C 19/52; E01C 19/526; E01C 23/121
USPC .................................. 294/62, 63.1
See application file for complete search history.

(56) References Cited

U.S. PATENT DOCUMENTS

| 705,277 A | 7/1902 | McDowell |
| 1,586,475 A | 5/1926 | Schondelmayer et al. |
| 2,541,863 A * | 2/1951 | Deans ............... E04G 21/16 294/103.1 |
| 2,578,072 A | 6/1951 | Kargol |
| 2,668,731 A * | 2/1954 | Neher ............... B66F 9/183 294/63.1 |
| 2,829,917 A * | 4/1958 | Wiora ............... B65G 7/12 294/106 |
| 3,061,350 A | 10/1962 | Miller |
| 3,237,979 A * | 3/1966 | Moody ............... E04G 21/16 294/16 |

(Continued)

FOREIGN PATENT DOCUMENTS

| DE | 2652915 C2 | 5/1978 |
| DE | 3029162 C2 | 2/1982 |
| EP | 0551828 B1 | 7/1993 |

Primary Examiner — Dean J Kramer
(74) Attorney, Agent, or Firm — Cara Morris

(57) ABSTRACT

An apparatus for extracting a paver stone, and the like from a preset position, including a pair of lifting plates having a body containing one or more lifting aid insertion openings at one end, and at an opposing end, a blade portion having substantially concave tabs with tab edges formed along a pair of slots terminating in one or more of stress relief openings between the body and the blade, wedging a first blade between the paver and a first adjacent paver and wedging a second blade at an opposing end of a paver and a second adjacent paver, substantially compressing the tabs storing spring energy in the blades, pushing the tab edges below the bottom plane of the paver, releasing the stored spring energy thereby substantially decompressing and re-forming the tabs such that the tab edges contact and engage the underside of the paver to be extracted.

15 Claims, 4 Drawing Sheets

(56) References Cited

U.S. PATENT DOCUMENTS

| | | | |
|---|---|---|---|
| 3,436,112 A * | 4/1969 | Pasquine | B65G 7/12 294/62 |
| 5,509,706 A | 4/1996 | Thalmann | |
| 7,686,362 B2 | 3/2010 | Layher | |
| 2017/0022039 A1 | 1/2017 | Cooper | |

* cited by examiner

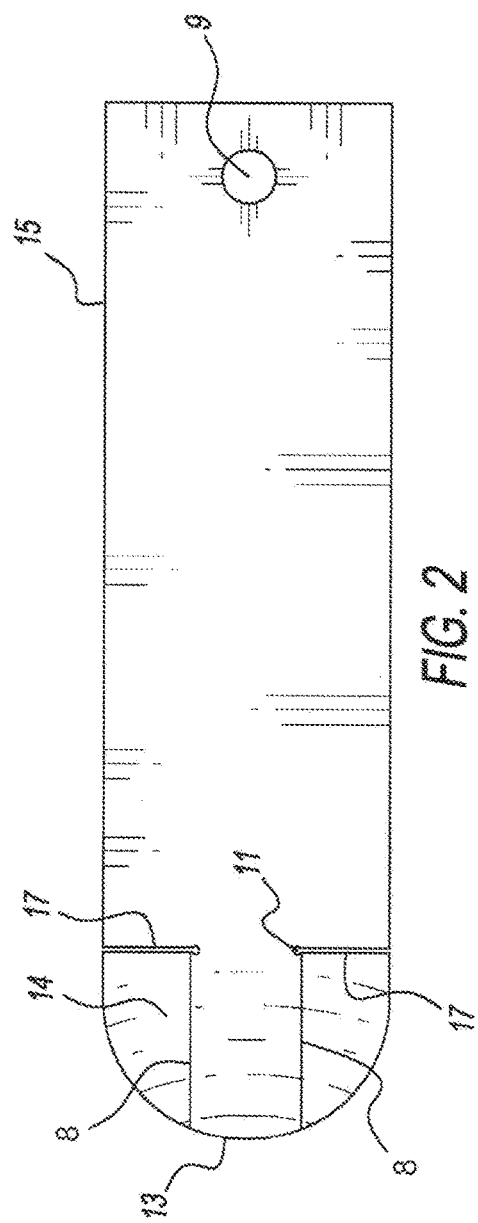
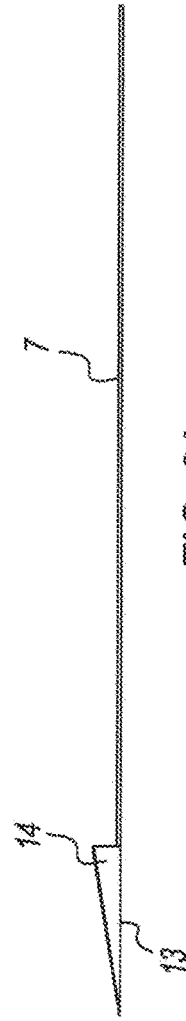
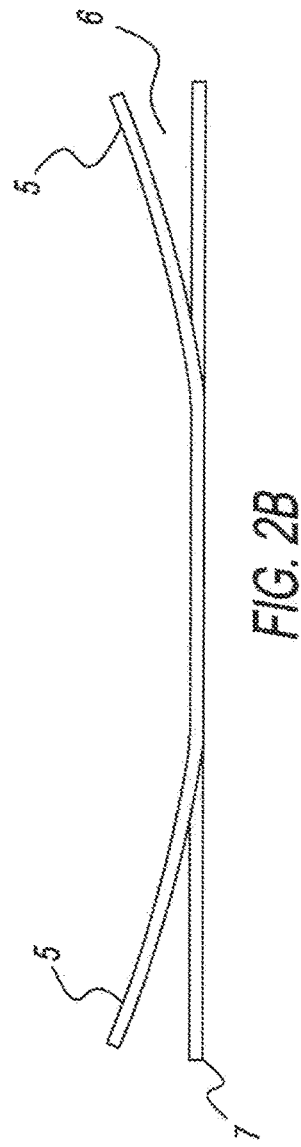
FIG. 2
FIG. 2A
FIG. 2B

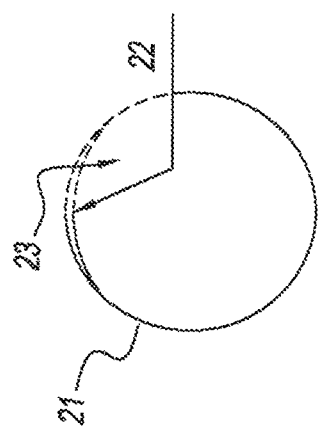
FIG. 4A
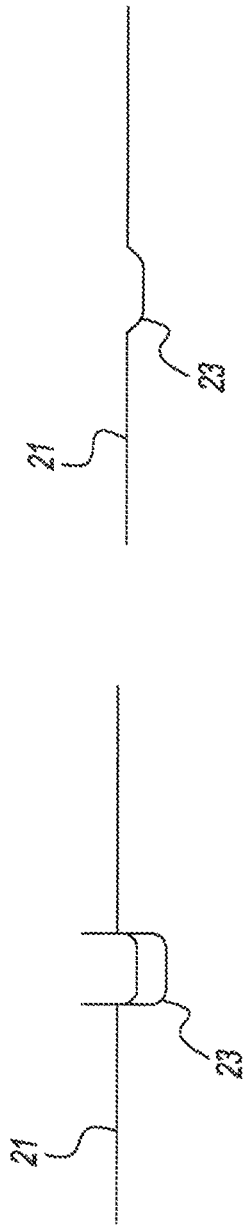
FIG. 4B
FIG. 4C
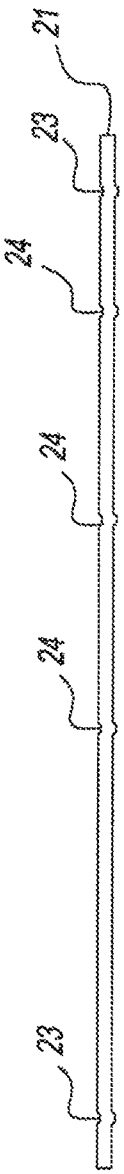
FIG. 4D

PAVER STONE, BRICK AND BLOCK EXTRACTION TOOL

FIELD OF THE INVENTION

The present invention relates to a tool and lifting system for extracting a paver stone and the like from its preset position.

BACKGROUND OF THE INVENTION

Tools for lifting or extracting preset paver stones are broadly known in the art as exemplified in the following described patents.

U.S. Pat. No. 705,277 issued to McDowell on Jul. 22, 1902 is directed to a lifting implement constructed to enable the gripping and carrying of bricks and includes two jaw members connected by a ratcheting bar used to adjust for the number of bricks to be lifted or carried and exert a compression force between the jaw members.

U.S. Pat. No. 1,586,475 issued May 25, 1926 to Schondelmayer et al. discloses a mechanism that allow the altering of a space between a pair of jaws to accommodate the varying dimensions of a brick, and wherein a single uppermost pivoted handle provides compression force between jaw elements.

U.S. Pat. No. 5,509,706 issued Apr. 23, 1996 to Thalmann is a paving stone, brick and tile tool with independent control of placement and lifting forces requiring one to apply a downward force upon a handle that extends jaws into the lifting position (placement) and squeezing the lever under the handle supplies the compression (grip) force.

European Publication No. 0551828 published Jul. 21, 1993, Hans-Jurgen Weber, Applicant, discloses a device for removing individual paving stones. The device uses a blade having a series of tabs and utilizes a plunger and yoke apparatus for lifting paver stones. In addition, the tabs disclosed in Weber are prone to failure due to repeated bending and flexing combined with stress that is concentrated on an area that is proportionally smaller than in the present invention.

None of the foregoing prior art discloses a reliable, scalable device that solves the problem of extracting a paver stone, tile, brick, block or the like, irrespective of dimension and weight.

SUMMARY OF THE INVENTION

The present invention discloses an improved tool and system for the extraction of a paver stone, tile, brick or block that is not permanently fixed in place with cement, thin set or similar material. The device uses one or more lifting plates and a lifting aid each of which are more particularly described below. The lifting plates are inserted or wedged into existing gaps between the paver to be extracted and one or more adjacent pavers. The lifting plates may be joined using the lifting aid, such as a rod or handle as more particularly described below, though the lifting plates are useful for extracting a paver without the necessity of the lifting aid. By way of example and not limitation, a lifting plate may be wedged as described above, with a force sufficient to compress the blade end of the lifting plate to a depth that permits the blade tabs to de-compress and re-form such that the tab edges engage with the bottom side of the paver to be extracted. Once the tab edges engage with the bottom side of the paver, the paver may be extracted; however, a user may also join one or more lifting plates together with a lifting aid. The lifting aid together with the lifting plates may assist the user in overcoming frictional resistance and applying a greater mechanical lifting force, and also providing user comfort.

More particularly, the present invention discloses an apparatus including: a pair of lifting plates, each said plate having (i) a body portion containing at least one lifting aid insertion opening at one end of the body, and (ii) at an opposing end of the plate, a blade portion having substantially concave tabs with tab edges formed along a pair of slots terminating in one or more of stress relief openings between the body and the blade, whereby upon (1) wedging a first blade between the paver and a first adjacent paver and wedging a second blade at an opposing end of a paver and a second adjacent paver, substantially compressing the tabs storing spring energy in the blades, and (2) pushing the tab edges below the bottom plane of the paver, releasing the stored spring energy thereby substantially decompressing and re-forming the tabs such that the tab edges contact and engage the underside of the paver to be extracted. In one non-limiting embodiment, the pair of lifting plates are joined, attached, affixed or secured together with one or more lifting aids.

One embodiment of the invention discloses (a) one or more opposing pairs of lifting plates, each said plate having (i) a body portion containing at least one lifting aid insertion opening at one end of the body, and (ii) at the opposing end of the plate, a blade portion having substantially concave tabs with tab edges formed along a pair of slots terminating in one or more stress relief openings between the body and the blade, whereby upon (1) wedging a first blade between the paver and a first adjacent paver and wedging a second blade at an opposing end of the paver and a second adjacent paver, substantially compressing the tabs storing spring energy in the blades, and (2) pushing the tab edges below the bottom plane of the paver, releasing the stored spring energy thereby substantially decompressing and re-forming the tabs such that the tab edges contact and engage the underside of the paver to be extracted; and (b) one or more lifting aids for joining two or more lifting plates.

In one non-limiting embodiment of the invention the lifting plate is constructed of a material having sufficient strength, formability, rigidity and toughness, including such materials as: spring steel, stainless steel, steel alloy, carbon fiber and plastics.

In another non-limiting embodiment of the invention the lifting aid is constructed of materials such as stainless steel, steel alloy, spring steel, carbon fiber, and plastics.

In another non-limiting embodiment, the lifting aid may be of a shape or construction that allows the joining of two or more lifting plates. By way of example and not limitation, the lifting aid may take the form of a handle, having a shape including but not limited to a substantially straight or curved or partially curved rod, or one having an irregular shape, or a shape that is ergonomically designed for user comfort, permitting a lifting force to be applied to extract a paver.

In another non-limiting embodiment, the opening at one end of the body portion of a lifting plate, may be of any shape or size to accommodate a lifting aid for the purpose of joining, attaching, affixing or securing together two or more lifting plates, including but not limited to an opening having a substantially rounded or rectangular shape or some other configuration or placement on the lifting plate for joining, attaching, affixing or securing together a lifting aid to a lifting plate.

In another non-limiting embodiment, the opening at one end of the body portion may include other means of joining, attaching, affixing or securing a lifting aid to a lifting plate. By way of example and not limitation, an opening having one or more of the following: (i) one or more perimeter openings, for example a slot or notch insert, or other shape, adjacent to or along the perimeter of the opening; (ii) one or more of a bevel, a lip, a hook, a latch, a clip, a bracket, a pin, a screw, a snap, a clamp, a fastener, or other mechanism adjacent to or in combination with the opening. It is contemplated that any one or more of the foregoing may be used independently or in combination with means for joining the lifting plates and lifting aid.

In another non-limiting embodiment, a lifting aid, having one or more of (i) a notch along the length of the lifting aid, (ii) at one or more terminal ends of the lifting aid, one or more of the following (a) a terminal end shape substantially the shape of an opening on a body portion of a lifting plate, including any one or more perimeter openings, (b) a shape or mechanism that permits the joining, attaching, affixing or securing the lifting aid to a lifting plate by way of example and not limitation, one or more of a slot, a bevel, a lip, a hook, a latch, a clip, a bracket, a pin, a screw, a snap, a clamp, or a fastener.

The invention also discloses a method for extracting a paver stone from a preset position, including the steps of: (a) wedging a first lifting plate between the paver and a first adjacent paver said first lifting plate having (i) a body portion containing at least one lifting aid insertion opening at one end of the body, and (ii) at an opposing end of the plate, a blade portion having substantially concave tabs with tab edges formed along a pair of slots terminating in one ore more stress relief openings between the body and the blade, (b) compressing the tabs and the tab edges thereby storing spring energy in the blade, (c) pushing the tab edges past the bottom plane of the paver, thereby releasing the stored spring energy thereby substantially decompressing and re-forming the tabs, (d) contacting and engaging the tab edges of the first lifting plate with the underside of the paver, (e) wedging at an opposing end of the paver, a second lifting plate between the paver and a second adjacent paver said second lifting plate having (i) a body portion containing at least one lifting aid insertion opening at one end of the body, and (ii) at an opposing end of the plate, a blade portion having substantially concave tabs with tab edges formed along a pair of slots terminating in one or more stress relief openings between the body and the blade, (f) compressing the tabs and tab edges of the second lifting plate thereby storing spring energy in the blade, (g) pushing the tab edges of the second lifting plate past the bottom plane of the paver releasing the stored spring energy thereby substantially decompressing and re-forming the tabs, (h) contacting and engaging the tab edges of the second lifting plate with the underside of the paver, (i) inserting a lifting aid through insertion openings of each of the lifting plates, (j) aligning said insertion openings with a pair of notches joining the lifting plates using the lifting aid, (k) applying an upward force to the lifting aid and transferring such upward force to the lifting plates, (l) extracting the subject paver from its preset position.

One non-limiting embodiment of the disclosed method includes using more than one paver lifting system to extract a paver. By way of example, and not limitation, a method for removing a paver that is standard or non-standard in weight, dimension or shape, may include wedging more than one pair of lifting plates connected by more than one lifting aid to the same or different sides of a paver to gain greater mechanical advantage for extracting a paver.

In another non-limiting embodiment, a lifting plate may have two or more aid insertion openings to allow the joining, attaching, affixing or securing together of more than two lifting plates.

In another non-limiting embodiment, a lifting plate may have two or more lifting aid insertion openings to allow two or more lifting aids to be used to extract a paver.

BRIEF DESCRIPTION OF THE DRAWINGS

Understanding of the present invention will be facilitated by consideration of the following detailed description of the preferred and practical embodiments of the present invention taken in conjunction with the accompanying drawings, in which like numerals refer to like parts, and wherein:

FIG. 2 shows a top view of a lifting plate according to the invention.

FIG. 2A shows a side view of a lifting plate according to the invention.

FIG. 2B shows an end view of a lifting plate according to the invention.

FIG. 4A shows an end view of a lifting aid according to the invention.

FIG. 4B shows a perspective side view of a lifting aid notch according to the invention.

FIG. 4C shows a side view of a lifting aid notch according to the invention.

FIG. 4D shows a side view of the lifting aid with notches according to the invention.

DETAILED DESCRIPTION OF THE INVENTION

Figure 1:
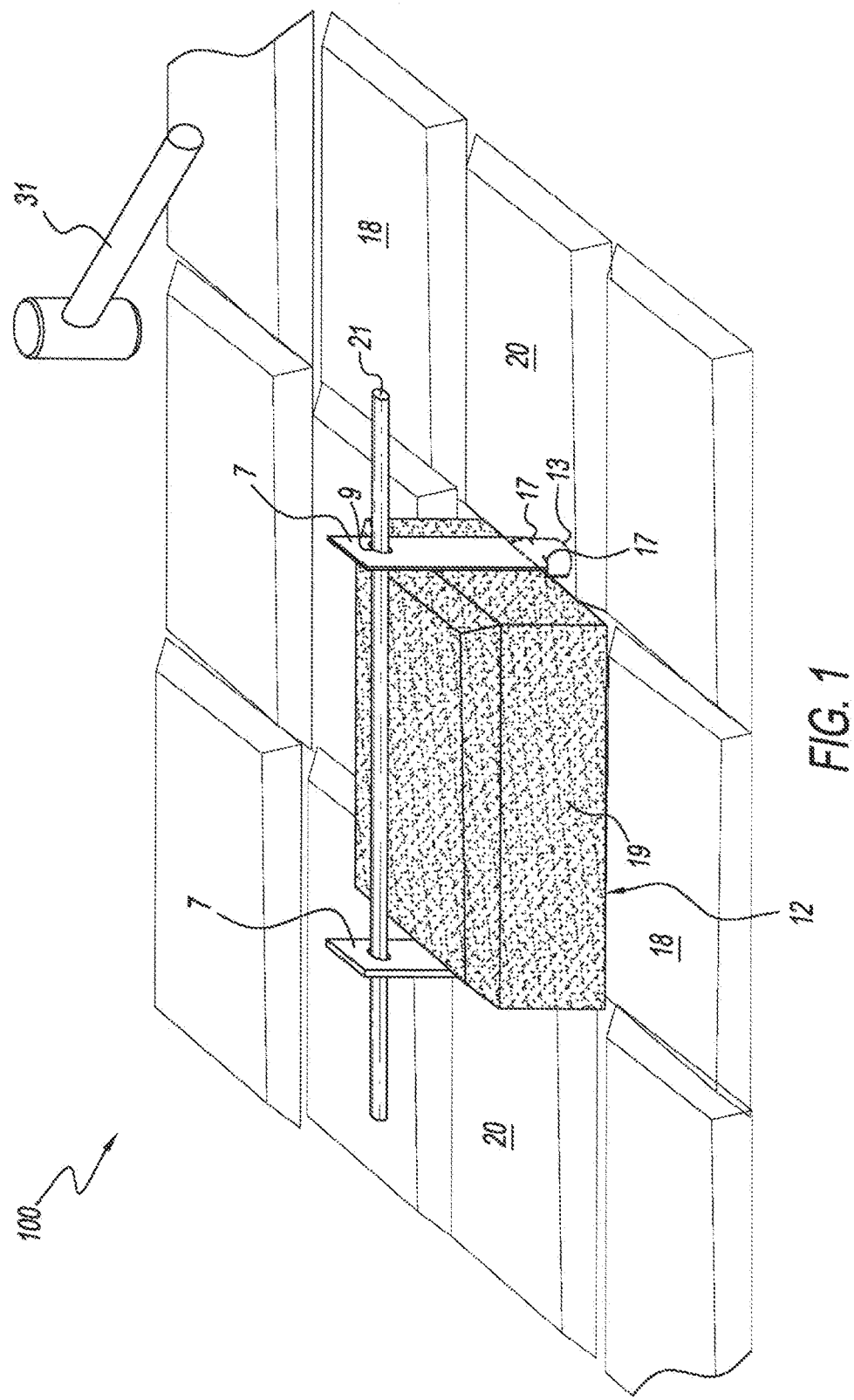
FIG. 1 shows a perspective view of the paver lifting system in accordance with the invention.

It is to be understood that the figures and descriptions of the present invention have been simplified to illustrate elements that are relevant for a clear understanding of the invention. Those of ordinary skill in the art may recognize that other elements and/or steps may be desirable in implementing the present invention. However, because such elements and steps are well known in the art, and because they do not facilitate a better understanding of the present invention, a discussion of such elements and steps is not provided herein. Throughout the following detailed description the same reference numerals refer to the same elements in all figures.

The following detailed description includes the best mode of carrying out the invention and is made for the purpose of illustrating the general principles of the invention and should not be taken in a limiting sense. The scope of the invention is determined by reference to the claims. Each part or function is assigned, even if structurally identical to another part, a unique reference number wherever that part is shown in the drawing figures.

Referring now to the drawings, wherein FIG. 1 is a paver lifting system 100. According to one non-limiting embodiment, the paver lifting system 100 includes (a) at least one paver, tile, brick, or block (collectively hereinafter referred to as "paver 19"), of some 3-dimensional shape, including by way of example and not limitation, a cube, rectangular prism or other polyhedron, (b) at least one lifting aid 21, (c) at least two substantially similar lifting plates 7 having a body portion 15 (FIG. 2) and a blade portion 13 (FIG. 3), the blade portion (FIG. 3) having substantially concave tabs 14

(FIG. 3), wherein each lifting plate 7 contains one or more insertion openings 9 for retaining the lifting aid 21 and for joining together the lifting plates 7.

Figure 3:
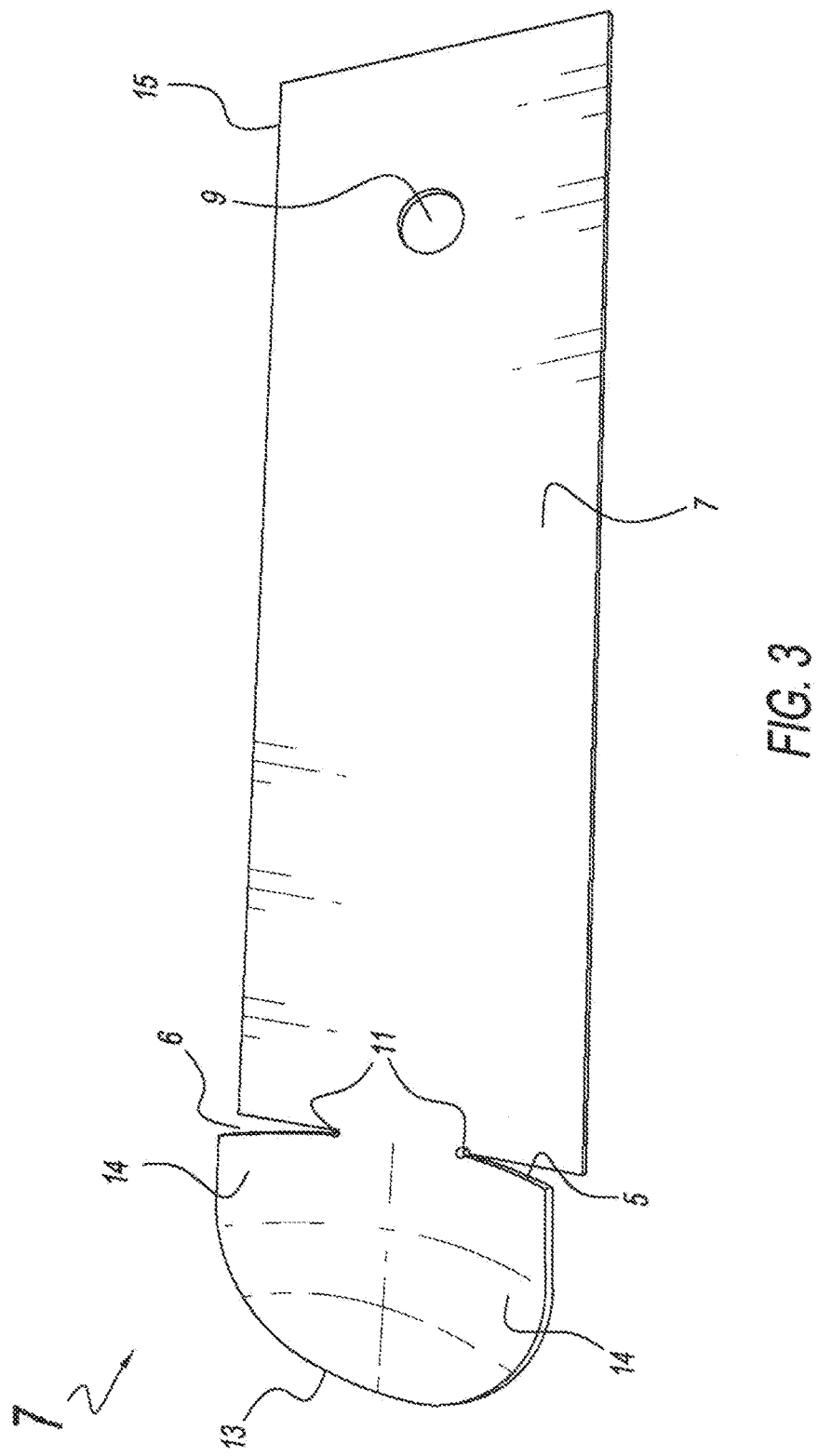
FIG. 3 shows a perspective view of a lifting plate according to the invention.

Referring to FIG. 1 and FIG. 3, the paver lifting system 100 is utilized by (a) wedging a first lifting plate 7 having a body portion 15 (FIG. 3) and a blade portion 13 between the subject paver 19 and an adjacent paver 20, the blade portion 13 having substantially concave tabs 14 (FIG. 3) formed along a pair of slots 17 and stress relief openings 11 (FIG. 3) between the body 15 (FIG. 3) and the blade 13, (b) compressing the tabs 14 (FIG. 3) and tab edges 5 (FIG. 3) thereby storing spring energy in the blade 13, (c) pushing the tab edges 5 (FIG. 3) past the underside 12 of paver 19 thereby releasing the stored spring energy substantially decompressing and re-forming the tabs 14 (FIG. 3), (d) contacting and engaging the tab edges 5 (FIG. 3) of the first lifting plate 7 with the underside 12 of paver 19, (e) wedging at an opposing end of the paver 19, a second lifting plate 7 between the paver 19 and an adjacent paver 20, said lifting plate 7, having a body portion 15 (FIG. 3) and a blade portion 13, the blade portion 13 having substantially concave tabs 14 (FIG. 3) formed along a pair of slots 17 and terminating at a pair of stress relief openings 11 between the body 15 (FIG. 3) and the blade 13, (f) compressing the tabs 14 (FIG. 3) and tab edges 5 (FIG. 3) of the second lifting plate 7 thereby storing spring energy in the blade 13, (g) pushing the tab edges 5 (FIG. 3) of the second lifting plate 7 past the underside 12 of paver 19 thereby releasing the stored spring energy substantially decompressing and re-forming the tabs 14 (FIG. 3), (h) contacting and engaging the tab edges 5 (FIG. 3) of the second lifting plate 7 with the underside 12 of paver 19, (i) inserting a lifting aid 21 through insertion openings 9 of each of the lifting plates 7, (j) aligning said insertion openings 9 with one or more notches, for example, notches 23 and 24 (FIG. 4D), joining the lifting plates 7 using the lifting aid 21, (k) applying an upward force on the lifting aid 21 and transferring such upward force to the lifting plates 7, (l) extracting the paver 19 from its preset position.

As shown in FIG. 1, in a non-limiting embodiment, coincident with the application of an upward force applied to the lifting system 100, the user may apply a downward force with a soft-faced hammer or mallet 31 to one or more of the adjacent pavers 18, 20 to counteract static friction referred to as stiction.

In another non-limiting embodiment a mechanical device (not shown) may be used to supply the upward force to the lifting aid 21 when the amount of force required to extract the paver 19 is greater than the user is able to manually apply. By way of example and not limitation, the mechanical device to provide an upward lifting force to the lifting aid 21 may include one or more of a jack, block and tackle, winch or other simple machine (not shown) used to provide a mechanical advantage.

In another non-limiting embodiment, the lifting plates 7 and lifting aid 21 may be constructed in larger relative sizes and of varying materials to accomplish the extraction of blocks having greater dimensions and weight than a typical paving stone 19. In yet another non-limiting embodiment, a complex machine may be used to supply the upward force to the lifting aid 21, such as a crane or forklift. In yet another non-limiting embodiment, the lifting aid 21 may have one or more notches 23.

In still another non-limiting embodiment, the lifting plates 7 maybe combined in a permanent, semi-permanent or non-permanent manner to increase the combined strength of the lifting plates 7 when applying the lifting force. By way of example and not limitation, adding two or more lifting plates 7 to each end of a lifting aid 21, or alternatively simultaneously using two or more lifting systems 100 on the same paver 19 for greater mechanical advantage, particularly when the paver 19 is oversized or in a shape other than a cube or rectangular prism.

Referring to FIG. 3, in a non-limiting preferred embodiment, the tabs 14 may have a radius bend of substantially 1.0 inch, and a vertical deflection (gap) 6 of substantially 0.25 inches between the body 15 and the tab edge 5 of the blade portion 13.

Referring now to FIG. 2, a top view of the lifting plate 7 is shown with the tabs 14 flattened and before forming the tabs 14 in a substantially concave shape (FIG. 3). Referring to FIG. 2, according to one non-limiting embodiment, lifting plate 7, includes a body portion 15, a pair of slots 17, two or more stress relief openings 11, and a blade portion 13. The lifting plate 7 may be constructed of any one or more materials having the sufficient strength, formability, rigidity and toughness, including stainless steel, steel alloy, spring steel, carbon fiber, and plastics. In a preferred non-limiting embodiment, the lifting plate 7 is constructed of spring steel.

Referring to FIG. 2, the body portion 15 may be substantially flat or any other non planar shape, and may be of various lengths and widths, and having an insertion opening 9 located at one end of the body 15. The insertion opening 9 may vary in shape, size or other dimension. In one non-limiting embodiment, a first insertion opening 9 may have may be circular or square in shape, and a second insertion opening 9 may have a different radius or have a different shape for example, a square or rectangle.

Referring to FIG. 2, the blade portion 13 is formed by shaping tabs 14 (FIG. 3) substantially along lines 8 and slots 17. Slots 17 terminate in stress relief openings 11 for distributing and reducing stress on the lifting plate 7 (FIG. 2A) when extracting a paver 19 (FIG. 1). In one non-limiting embodiment, one or more of the stress openings 11, are shaped to reduce stress caused in part by the applied upward lifting force. The stress openings may be of any shape that serves this purpose, including by way of example and not limitation, in the shape of one or more of a substantially circular, curved, rectangular, triangular or u-shape.

The leading edge of blade portion 13 is useful as a wedge between pavers 19 and 20 (FIG. 1). In one non-limiting embodiment, the blade portion 13 may have one or more of (a) a substantially concave or convex leading edge, (b) a substantially straight leading edge, (c) an irregularly shaped leading edge, (d) a substantially serrated leading edge.

Referring to FIG. 2, the opposing edge of blade portion 13 along the slots 17 form a lifting tab edge 5 (FIG. 3). The blade portion 13 includes a center portion defined substantially along lines 8. The area between lines 8 may be substantially flat or partially curved. Blade tabs 14 are formed substantially along the lateral sides of the lines 8, with a substantially concave radial bend (FIG. 2A, FIG. 2B and FIG. 3) forming a vertical deflection (gap) 6 (FIG. 2B and FIG. 3) between the body 15 and the blade portion 13 (FIG. 2).

Referring to FIG. 3, in a non-limiting preferred embodiment, tabs 14 may have a radius bend of substantially 1.0 inch, and a vertical deflection (gap) 6 of substantially 0.25 inches between the body 15 and tab edges 5 of the blade portion 13.

Turning to FIG. 4A, FIG. 4B, FIG. 4C, and FIG. 4D, the lifting aid 21 includes at least one notch 23 (FIG. 4B and FIG. 4C). In a preferred embodiment, the notch 23 (FIG. 4A)

having a depth of substantially 0.025 inches (FIG. 4C) and radius 22 (FIG. 4A) of substantially 0.125 inches.

Turning to FIG. 4D, in one non-limiting embodiment the lifting aid 21 includes one or more notches 23, 24 along the length of aid 21. By way of example and not limitation, a lifting plate 7 having more than one insertion opening 9 (not shown) permits the joining of two or more lifting plates with one or more lifting aids 21 of varying lengths or diameters. By way of example, such configuration permits extraction of a paver 19 (FIG. 1) that is oversized or non-standard in size, weight or dimension. By way of example and not limitation, a hexagonally shaped paver (not shown) may permit the use of three or more lifting plates 7 connected by two or more aids 21 to surround the paver 19 with the lifting system 100 on more than two opposing sides of the paver 19.

In another non-limiting embodiment, a method for extracting paver 19 may use the lifting system 100, together with a second lifting system (not shown) oriented substantially 90 degrees based on the plane of the paver 19, to the first lifting system 100 such that the lifting plates 7 of the second lifting system have more than one lifting aid insertion opening 9 permitting insertion of a second lifting aid 21 that does not interfere with the first lifting aid 21.

In one non-limiting embodiment, the lifting plates 7 and lifting aid 21 may be constructed through a variety of processes and techniques, such as turning, stamping, casting, 3D printing, laser cutting, additive manufacturing, metal forming, as well as utilizing adhesives, mating parts or other means of joining or molding materials. Such processes and techniques are well-known to those skilled in the art of manufacturing and assembling two-dimensional and three-dimensional shaped fixtures constructed from metals such as steel, stainless steel, spring steel, steel alloy, magnesium, carbon fiber or titanium, plastics and recyclable materials, including secondary processes or techniques to protect the lifting plates and lifting aid from oxidation, or a heat treatment or other processes to improve material properties.

The present invention has been described with reference to the preferred embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

I claim:

1. An apparatus for extracting a paver from a preset position, comprising:
   a pair of lifting plates, each plate having (i) a body portion containing at least one lifting aid insertion opening at one end of the body portion, and (ii) at an opposing end of the plate, a blade portion having substantially concave tabs with tab edges formed along a pair of slots terminating in one or more stress relief openings between the body portion and the blade portion, whereby upon (1) wedging a first blade on the body portion between the paver and a first adjacent paver and wedging a second blade on the body portion at an opposing end of the paver and a second adjacent paver, substantially compressing the tabs storing spring energy in the first blade and the second blade, and (2) pushing the tab edges below a bottom plane of the paver, releasing the stored spring energy thereby substantially decompressing and re-forming the tabs such that the tab edges contact and engage the underside of the paver to be extracted.

2. The apparatus in claim 1, wherein a pair of lifting plates are joined, attached, affixed or secured together with one or more lifting aids.

3. The apparatus of claim 2, wherein the lifting aid, having one or more of (a) notches along the length of the lifting aid, (b) at one or more terminal end (i) a terminal end shape substantially matching the shape of an opening on a body portion of a lifting plate, (ii) a slot, a bevel, a lip, a hook, a latch, a clip, a bracket, a pin, a screw, a snap, a clamp, a fastener, or other mechanism adjacent to or in combination with the opening, for joining attaching, affixing or securing a lifting aid to a lifting plate.

4. The apparatus of claim 2, wherein the lifting aid is a handle having one or more shapes comprising: (a) a substantially straight shape, (b) a substantially curved or partially curved shape, (c) an irregular shape, (d) an ergonomic shape, thereby permitting a lifting force to be applied to extract a paver.

5. The apparatus of claim 2, wherein tabs have a radius bend of substantially 1.0 inch, and a vertical deflection of substantially 0.25 inches between the body portion and the blade portion.

6. The apparatus of claim 2, wherein the one or more lifting aids having one or more notches along the length of the lifting aid have a depth of substantially 0.025 inches and radius of substantially 0.125 inches.

7. The apparatus in claim 1, wherein the lifting plates are constructed of a material having sufficient strength, formability, rigidity and toughness, including one or more spring steel, stainless steel, steel alloy, carbon fiber, and plastics.

8. The apparatus in claim 1, wherein the body portion has one or more lifting aid insertion openings.

9. The apparatus in claim 1, wherein one or more stress openings are one or more of a substantially (a) circular shape, (b) curved shape, (d) rectangular shape, (d) triangular shape, (e) u-shape.

10. The apparatus of claim 1, wherein the opening at one end of a body portion of a lifting plate, having one or more of: (a) a first opening that varies in shape or dimension from one or more other openings, (b) a slot, notch insert, or other shape adjacent to or along the perimeter of the opening; (c) a slot, a bevel, a cavity, a lip, a hook, a latch, a clip, a clamp or other mechanism, adjacent to or in combination with the opening, for joining, attaching, affixing or securing a lifting aid to a lifting plate.

11. The apparatus of claim 1, wherein a leading edge of the blade portion has one or more of a substantially (a) concave or convex leading edge, (b) straight leading edge, (c) serrated leading edge.

12. The apparatus of claim 1, wherein tabs are formed from the lateral sides of a blade portion, said tabs having a substantially concave radial bend thereby forming a vertical deflection gap between the plane of a body portion and the blade portion.

13. An apparatus for extracting a paver from a preset position, comprising:
   (a) one or more opposing pairs of lifting plates, each said plate having (i) a body portion containing at least one lifting aid insertion opening at one end of the body portion, and (ii) at an opposing end of the plate, a blade portion having substantially concave tabs with tab edges formed along a pair of slots terminating in one or more stress relief openings between the body portion and the blade portion, whereby upon (1) wedging a first blade on the body portion between the subject paver and a first adjacent paver and wedging a second blade on the body portion at an opposing end of the paver and a second adjacent paver, substantially compressing the tabs storing spring energy in the first blade and the second blade, and (2) pushing the tab edges below a bottom plane of the paver, releasing the stored spring energy thereby substantially decompressing and re-forming the tabs such that the tab edges contact and engage the underside of the paver to be extracted; and (b) one or more lifting aids for joining one or more opposing pairs of lifting plates.

14. A method for extracting a paver from a preset position, including the steps of:
   (a) wedging a first lifting plate between the paver and a first adjacent paver said first lifting plate having (i) a body portion containing at least one lifting aid insertion opening at one end of the body portion, and (ii) at an opposing end of the plate, a blade portion having substantially concave tabs with tab edges formed along a pair of slots terminating in one or more stress relief openings between the body portion and the blade portion,
   (b) compressing the tabs and the tab edges thereby storing spring energy in the blade portion,
   (c) pushing the tab edges past the bottom plane of the paver, thereby releasing the stored spring energy thereby substantially decompressing and re-forming the tabs,
   (d) contacting and engaging the tab edges of the first lifting plate with the underside of the paver,
   (e) wedging at an opposing end of the paver, a second lifting plate between the paver and a second adjacent paver said second lifting plate having (i) a body portion containing at least one lifting aid insertion opening at one end of the body portion, and (ii) at an opposing end of the plate, a blade portion having substantially concave tabs with tab edges formed along a pair of slots terminating in one or more stress relief openings between the body portion and the blade portion,
   (f) compressing the tabs and tab edges of the second lifting plate thereby storing spring energy in the blade portion,
   (g) pushing the tab edges of the second lifting plate past the bottom plane of the paver releasing the stored spring energy thereby substantially decompressing and re-forming the tabs,
   (h) contacting and engaging the tab edges of the second lifting plate with the underside of the paver,
   (i) inserting a lifting aid through insertion openings of each of the lifting plates,
   (j) aligning said insertion openings with a pair of notches joining the lifting plates using the lifting aid,
   (k) applying an upward force to the lifting aid and transferring such upward force to the lifting plates,
   (l) extracting the paver.

15. The method of claim 14, including the steps of: (a) wedging two or more lifting plates between a paver and one or more adjacent pavers, each lifting plate having (i) a body portion, and (ii) a blade portion having substantially concave tabs and tab edges formed along a pair of slots and stress relief openings between the body portion and the blade portion, (b) compressing the tabs and the tab edges of the lifting plates thereby storing spring energy in the blade portion, (c) pushing the tab edges of the lifting plates past the bottom plane of the subject paver thereby releasing the stored spring energy thereby substantially decompressing and re-forming the tabs, (d) contacting and engaging the tab edges of the lifting plates with the underside of the paver, (e) inserting two or more lifting aids through one or more insertion openings of two or more lifting plates, (f) aligning said insertion openings with one or more notches joining, attaching, affixing or securing the two or more lifting plates using the two or more lifting aids, (g) applying an upward force on the lifting aids and transferring such upward force to the lifting plates, (h) extracting the paver, wherein optionally, coincident with an upward force applied to a lifting system, a downward force is applied using one of a soft-faced hammer or mallet, to one or more of the adjacent pavers to counteract stiction.

* * * * *